United States Patent [19]

Batheja et al.

[11] Patent Number: 4,826,649

[45] Date of Patent: May 2, 1989

[54] HYDRAULIC CONTROL FOR ROD DRIVE FOR WATER-COOLED NUCLEAR REACTORS, ESPECIALLY HEATING REACTORS

[75] Inventors: Pramod Batheja, Erlangen; Manfred Öhrlein, Höchberg; Peter Rau, Leutenbach; Eduard Weber, Nürnberg, all of Fed. Rep. of Germany

[73] Assignee: Siemens Aktiengesellschaft, Berlin and Munich, Fed. Rep. of Germany

[21] Appl. No.: 61,292

[22] Filed: Jun. 11, 1987

[30] Foreign Application Priority Data

| Jun. 13, 1986 | [DE] | Fed. Rep. of Germany | 3619988 |
| Sep. 10, 1986 | [JP] | Japan | 3630814 |
| Apr. 29, 1987 | [JP] | Japan | 3714313 |
| Jun. 4, 1987 | [JP] | Japan | 3718754 |

[51] Int. Cl.$^4$ .............................................. G21C 7/16
[52] U.S. Cl. ............................................... 376/230
[58] Field of Search ........................................ 376/230

[56] References Cited

U.S. PATENT DOCUMENTS

| 3,844,882 | 10/1974 | Bevilacqua et al. | 376/230 |
| 3,940,310 | 2/1976 | Irion et al. | 376/230 |
| 4,690,794 | 9/1987 | Onodera | 376/230 |

FOREIGN PATENT DOCUMENTS

| 0031541 | 12/1980 | European Pat. Off. |
| 0173767 | 12/1984 | European Pat. Off. |
| 1900410 | 7/1969 | Fed. Rep. of Germany |
| 3345099 | 6/1985 | Fed. Rep. of Germany |
| 3435584 | 4/1986 | Fed. Rep. of Germany |
| 53-40191 | 4/1978 | Japan | 376/230 |
| 59-13985 | 1/1984 | Japan | 376/230 |
| 59-48690 | 3/1984 | Japan | 376/230 |

OTHER PUBLICATIONS 11 msr, messen-steuern-regeln (Trade Fairs-Taxes-Rules) VEB Verlag Technik, Berlin, Germany; Vol. 11, Nov. 1978, pp. 638–642.

Primary Examiner—Charles T. Jordan
Assistant Examiner—Richard Klein
Attorney, Agent, or Firm—Herbert L. Lerner; Larence A. Greenberg

[57] ABSTRACT

A hydraulic control rod drive for a water-cooled nuclear reactor includes a control valve assembly outside the reactor pressure vessel for influencing the fluid quantity on the pressure side of a fluid pump assembly for adjusting control rods in raising and lowering directions and to maintain a control rod position. A control valve assembly includes the following control branches for actuating each of the control rods: a holding branch connected between a pressure line and a pressure side of a piston/cylinder system, a first fluid throttle and a bypass fluid throttle upstream thereof relative to a drop of the first fluid throttle for discharging into a drain, the first fluid throttle and the bypass fluid throttle having throttle cross sections allowing a fluid flow therethrough sufficient to hold a given control rod in a given position with the fluid pump assembly running; a raising branch connected to the holding branch upstream and downstream of the first fluid throttle, and a series circuit having a raising valve assembly and a second fluid throttle; and a lowering branch connected to the holding branch downstream of the first fluid throttle relative to the drop of the first fluid throttle and discharging into a cooling water reservoir, and a series circuit of a lowering valve and a third fluid throttle. A device is also provided for automatically opening the lowering valve in the lowering branch if the raising valve in the raising branch sticks in an open position.

10 Claims, 6 Drawing Sheets

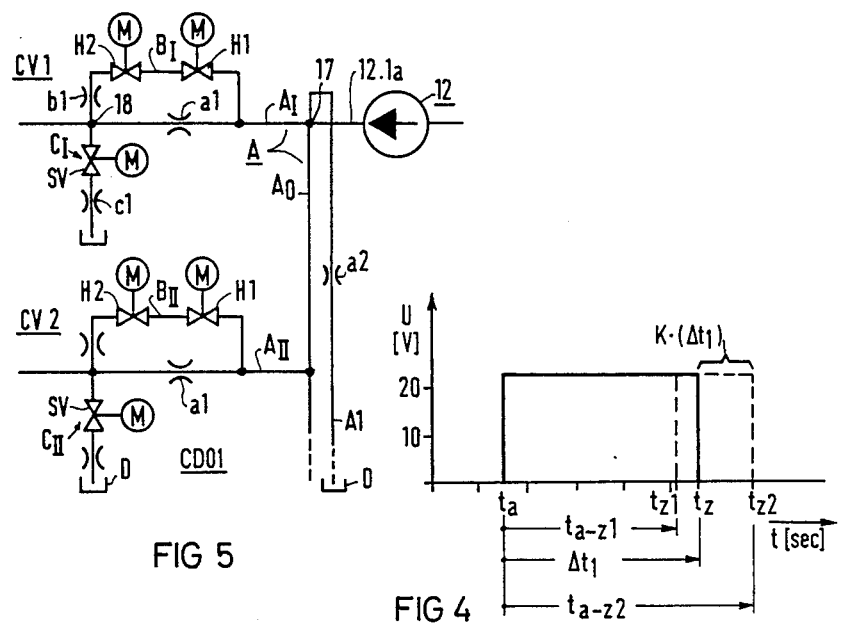
FIG 5
FIG 4
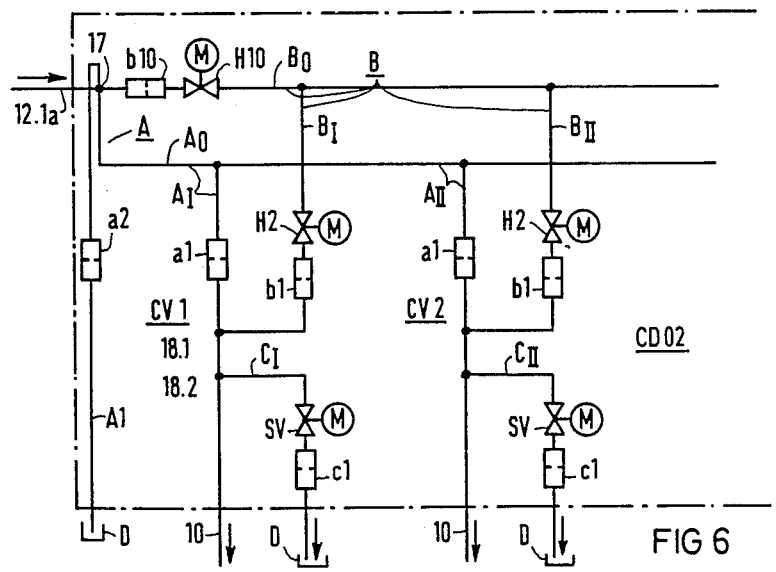
FIG 6

HYDRAULIC CONTROL FOR ROD DRIVE FOR WATER-COOLED NUCLEAR REACTORS, ESPECIALLY HEATING REACTORS

A water-cooled nuclear reactor, especially a heating reactor that operates on the principle of internal natural circulation, is known from German Published, Non-Prosecuted Application DE-OS No. 33 45 099, corresponding to U.S. Application Ser. No. 005,289, filed Jan. 16, 1987 and particularly FIGS. 1–3 thereof. Such a reactor has a reactor pressure vessel and a reactor core supported therein, including a fuel element cluster disposed upright, control rods supported in such a way that they are insertable and retractable in interspaces between the fuel elements, as well as a supporting structure for fuel elements, control rods and the drives thereof. FIG. 3 of that publication shows the principle of a hydraulic control rod drive for the reactor, wherein the control rods are retractable against the force of gravity and are insertable in the direction of the force of gravity. Drive rods of the control rods having hydraulic piston/cylinder systems are provided, to which the cooling water can be supplied from below as working fluid through non-illustrated fluid lines that are internal to the reactor. The cooling water reservoir serves as a hydraulic drain. European Published, Non-Prosecuted Application No. 0 173 767 furthermore shows that it is known to provide a fluid pump external to the reactor, which communicates through pressure, suction lines and associated line ducts with the piston/cylinder systems on the pressure side and with the coolant reservoir in the reactor pressure vessel on the suction side. It is also known to vary the quantity of fluid on the pressure side of the fluid pump, by means of a control valve assembly disposed on the outside of the reactor pressure vessel, in order to adjust the control rods in the "raising" or "lowering" direction, or for the sake of maintaining the control rod position that has been reached.

In the prior art control rod drive according to the above-mentioned European Application, the influence upon the fluid quantity on the compression side of the fluid pump is effected not only by means of the control valve assembly in the form of a pump bypass valve, but also, and above all, by adjusting the rpm of the fluid pump. However, in the prior art devices, a finely metered adjustment of the control rods is not possible if the pump is operating as a constant pump in its optimal rpm range and operation cannot be maintained if a pump malfunction or a disruption in the branch of the control valve assembly provided for the operation of raising the control rods occurs.

It is accordingly an object of the invention to provide a hydraulic control rod drive for water-cooled nuclear reactors, especially heating reactors, which overcomes the hereinafore-mentioned disadvantages of the heretofore-known devices of this general type, with which a finely metered adjustment of the control rods is possible even if the pump is operating as a constant pump in its optimal rpm range, and in which both the disposition of the fluid pump external to the reactor and the control valve assembly connected to the pump are intended to be inherently safe, in the sense that in the event of either a pump malfunction or a disruption in the branch of the control valve assembly provided for the operation of raising the control rods, operation can be maintained.

With the foregoing and other objects in view there is provided, in accordance with the invention, in a water-cooled nuclear reactor, especially a heating water reactor including:

a reactor pressure vessel;

a reactor core supported the reactor pressure vessel including a fuel element cluster disposed in an upright position, the fuel element cluster including fuel elements spaced apart in the reactor core defining interspaces inside and between the fuel rods, control rods, drive means for inserting the control rods in the direction of the force of gravity and retracting the control rods against the force of gravity in the interspaces, and a supporting structure for the fuel elements, the control rods and the drive means;

the control rods having guide rods with hydraulic piston/cylinder systems, fluid lines inside the reactor feeding a working fluid in the form of cooling water to the guide rods from below, and a hydraulic drain in the form of a cooling water reservoir in the reactor pressure vessel; and a fluid pump assembly having a pressure side and a suction side, suction lines, pressure lines and associated line ducts connecting the pressure side of the fluid pump assembly with the piston/cylinder systems and connecting the suction side of the fluid pump assembly with the cooling water reservoir;

an improvement comprising a hydraulic control rod drive assembly having at least one control rod drive, including:

a control valve assembly disposed outside the reactor pressure vessel and connected to the fluid lines and the pressure lines, for influencing the fluid quantity on the pressure side of the fluid pump assembly in order to adjust the control rods in a raising and a lowering direction and to maintain a control rod position;

the control valve assembly including the following control branches for actuating each of the control rods:

a holding branch having an inlet side connected to the pressure line and an outlet side connected to the pressure side of the piston/cylinder system, a first fluid throttle, and a bypass fluid throttle disposed upstream of the first fluid throttle relative to a drop of the first fluid throttle for discharging into the drain, the first fluid throttle and the bypass fluid throttle having throttle cross sections dimensioned for allowing a fluid flow therethrough sufficient to hold a given control rod in a given position with the fluid pump assembly running;

a raising branch having ends respectively connected to the holding branch upstream and downstream of the first fluid throttle, and a series circuit having a raising valve assembly and a second fluid throttle; and a lowering branch having one end connected to the holding branch downstream of the first fluid throttle relative to the drop of the first fluid throttle, another end discharging into the cooling water reservoir, and a series circuit of a lowering valve and a third fluid throttle;

and means for automatically opening the lowering valve in the lowering branch if the raising valve in the raising branch sticks in an open position. The raising valve assembly may also include at lest two raising valves connected in series with one another for reducing a fluid flow through the raising branch if the raising branch is malfunctioning, at least enough to prevent further raising of a control rod being controlled.

The advantages attainable with the invention are above all that the inherent safety of the control valve assembly from further retraction or from undesirable sticking of a control rod in the retracted position in the event that a raising valve sticks in its open position is increased considerably; that is, the safety that already exists without reducing the rpm or shutting off the fluid pump is considerably increased, so that taking total safety into account, that is, including the option of an emergency shutdown of the fluid pump, operator error can be considered to be precluded. The invention is particularly suitable for heating reactors that operate on the principle of a pressurized water reactor with internal natural circulation, or for heavy water moderated pressurized water reactors (pHWR = Pressure heavy Water Reactor).

Other features which are considered as characteristic for the invention are set forth in the appended claims.

Although the invention is illustrated and described herein as embodied in a hydraulic control rod drive for water-cooled nuclear reactors, especially heating reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 4 is a pulse diagram in which the signal voltage U is plotted in volts against the time t in seconds, this voltage being one that can be picked up by position transducers at the raising valves, wherein the point in time $t_a$ represents the beginning of the valve opening operation and the point in time $t_z$ represents a normal point in time of a closing operation;

FIG. 5 is a schematic circuit diagram of a control valve assembly equipped with serial redundancy in the raising branch; that is, two raising valves each are connected in series with one another in one raising branch;

FIG. 6 is a simplified schematic circuit diagram for the circuit of FIG. 5, which again has serial redundancy, but in which one of the serial raising valves is connected to the input side of all of the raising branches, as a master raising valve;

Figure 1:
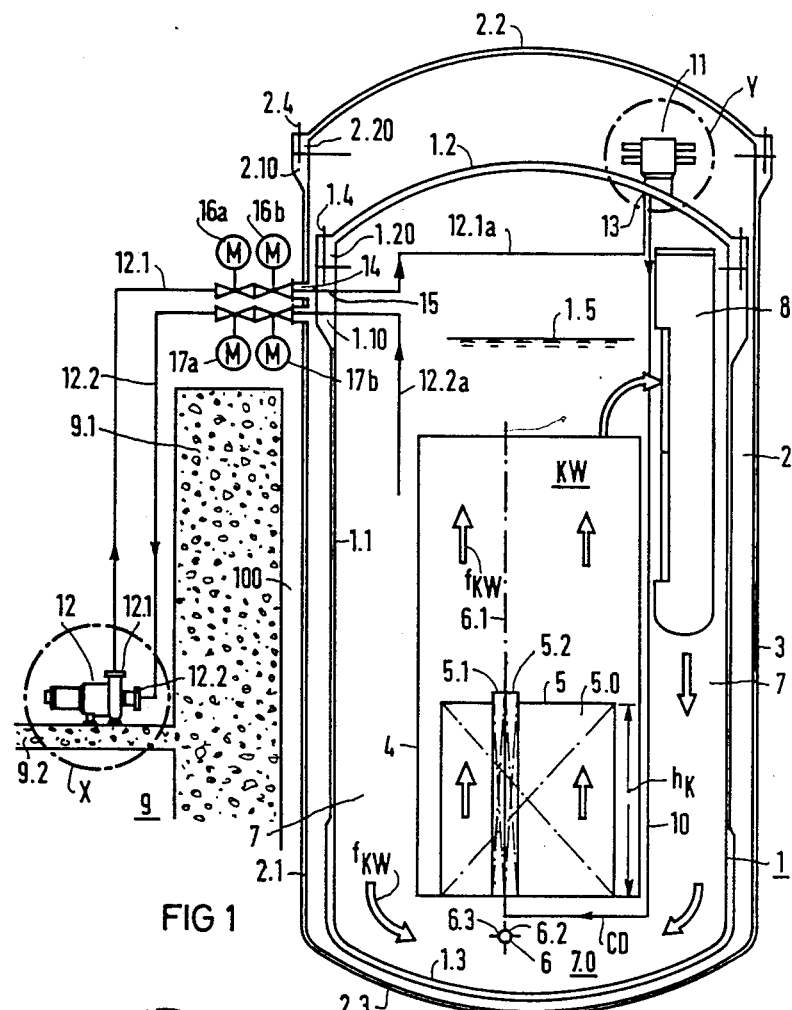
FIG. 1 is a fragmentary, diagrammatic, partly crosssectional view of a heating reactor having an internal pressure vessel and an external safety vessel, which operates on the principle of an internal natural circulation pressurized water reactor (INR) and is equipped with a control rod drive according to the invention.

Referring now to the figures of the drawings in detail and first, particularly, to FIG. 1 thereof, there is seen a diagrammatic illustration of a heating reactor having an internal, substantially cylindrical reactor pressure vessel 1 and an external safety vessel 2 enveloping the pressure vessel with an interspace 3 spacing them apart. The two vessels have respective lower vessel parts 1.1, 2.1, caps 1.2 and 2.2 that are spherically arched toward the outside, and vessel bottoms 1.3 and 2.3 that are spherically arched toward the outside. The lower vessel parts 1.1 and 2.1 and the caps 1.2 and 2.2 are each provided with vessel flanges 1.10, 2.10 and 1.20 and 2.20 having a reinforced wall thickness, and the flanges 1.10–1.20 and 2.10–2.20 are each clamped together in a pressure-tight manner by means of cap screw 1.4 and 2.4, respectively.

Supported in the interior of the pressure vessel 1 is a cylindrical core vessel 4 which is open at the bottom and the top and a reactor core 5 on a non-illustrated supporting structure in the core vessel. The reactor core may, for example, be constructed as shown in German Published, Non-Prosecuted Application DE-OS No. 33 45 099 or European Published, Non-Prosecuted Application No. 0 173 767. The reactor core 5 includes a fuel element field 5.0 with fuel elements disposed upright, only two of which, 5.1, 5.2 are shown. Control rods 6 are supported in such a way that they are insertable and retractable in interspaces between the fuel elements 5.1, 5.2, which are cross-shaped in the present case due to a rectangular cross section of the fuel elements. Control rod guide rods 6.1 shown in phantom, control rod guide tubes 6.2 guided on the guide rods 6.1 and cross-shaped projecting or spaced apart absorber plates 6.3 secured to the control rod guide tubes 6.2, are part of the control rods 6; the length of the absorber plates 6.3 is at least as great as the core height $h_k$ and preferably somewhat greater than the core height, as shown. A piston/cylinder system combined with each of the control rods 6 enables an incremental raising or lowering of the control rods out of or in to the reactor core 5 and permits the control rods 6 to be retracted upward out of the core 5 with the absorber rod plates or parts 6.3 thereof, which means that the neutron flux density in the core increases to a greater or lesser extent, or they can be inserted once again to a more or less complete extent into the core 5 by lowering the fluid pressure, which means that the neutron flux density in the core decreases to a more or less pronounced extent, up to the point of the complete shutdown of the nuclear reaction (except for the so-called after-heat of decay).

In the present case it is assumed that each of the control rods 6 is equipped with such a piston/cylinder system (such as described, for example, in German Published, Non-Prosecuted Application DE-OS No. 33 45 099 or in greater detail in European Published, Non-Prosecuted Application No. 0 173 767) and the cooling water of the reactor serves as the working fluid. The reactor pressure vessel 1 is filled up to a level 1.5 with cooling water, which serves at the same time as a moderator. During rated operation of the nuclear fission reaction in the nuclear reactor core 5, the cooling water KW takes it course upward along vertically extending cooling canals of the fuel elements 5.1, 5.2, etc. as indicated by outlined arrows $f_{kw}$, due to the principle of natural circulation, without requiring internal cooling water pumps, and in so doing cools the fuel elements; the heated cooling water, which has a lower specific gravity, then laterally enters an annular chamber 7 between the core vessel 4 and the lower part 1.1 of the pressure vessel, specifically entering heat exchangers 8 disposed therein, only one of which is diagrammatically outlined. Reference symbol KW is also used to represent the reservoir or drain for the cooling water, as well as the water itself. A U-shaped coil of pipes is disposed in the heat exchangers 8 and the secondary coolant, which once again is water in particular, circulates in the coil and the reactor cooling water KW flows outside past the U-shaped pipes and in so doing cools down and then flows farther downward in the annular chamber 7 into a chamber 7.0 underneath the reactor core 5 because its specific gravity increases as it cools, after which the circulation begins again.

A wall/ceiling construction of the heating reactor building is shown at reference numeral 9. A wall 9.1 of the building is in the form of an annular or polygonal wall that encompasses both vessels 1, 2 with an interspace 100 therebetween. The annular or polygonal wall at the same time serves as a biological shield and the outer safety vessel 2 is mounted on a non-illustrated upright frame or the like on a foundation construction, which is also not shown. The internal pressure vessel 1 is also supported by means of vertical ribs and by means of spacer ribs disposed on the outer jacket thereof in a radially central and axially thermally movable manner coaxially within the safety vessel; the support elements are again not shown, because they are unnecessary for an understanding the invention.

The hydraulic control rod drive, which is the actual subject of the invention, is identified as a whole by reference symbol CD. The hydraulic control rod drive includes the aforementioned non-illustrated piston/cylinder systems on the control rods 6 and a fluid line 10 internal to the reactor (only one of the lines is shown, but it is understood that a plurality of lines is provided, each of which is associated with one of the control rods 6). The fluid line 10 supplies the cooling water serving as the working fluid from below to the piston/cylinder system of the respective control rod 6. The control rod drive CD also includes a control valve assembly 11, disposed on the outside of the reactor pressure vessel and secured in a pressure-tight manner, which is intended for influencing the fluid quantity on the pressure side of a fluid pump 12 in order to adjust the control rod 6 in the "raising" or "lowering" direction, or for holding the control rod position that has been assumed; the one representative internal fluid line 10 extends downward, for instance, as shown in the annular chamber 7, from the control valve assembly 11 through a pressure-tight line duct 13 that passes through the cap 1.2. Finally, the aforementioned fluid pump 12 external to the reactor is also part of the control rod drive CD; the pump is secured on the ceiling 9.2 of the building and the pump communicates with the piston/cylinder systems of the control rods 6 on the pressure side through the aforementioned control valve assembly 11 and with the cooling water reservoir KW in the reactor pressure vessel 1 on the suction side through a pressure line 12.1 and a suction line 12.2 as well as through another pressure-tight line duct 14 in the jacket wall of the safety vessel 2 and a further pressure-tight line duct 15 in the flange portion of the lower part 1.1 of the pressure vessel. Inside the pressure vessel 1, an internal line segment 12.1a of the pressure line 12.1 extends from the line duct 15 as far as the line duct 13 of the control valve assembly 11. The working fluid is withdrawn from the cooling water reservoir KW by the fluid pump 12 through the other internal suction line segment 12.2a.

Figure 2:
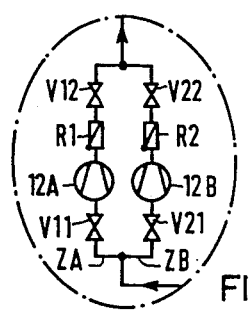
FIG. 2 is a schematic circuit diagram for the portion X of the circuitry of the fluid pump assembly of FIG. 1.

FIGS. 1 and 2 show that the fluid pump 12 has a pressure connector 121 and a suction connector 122, to which the respective pressure line 12.1 and suction line 12.2 are connected, and FIG. 2 shows that two fluid pumps 12A and 12B are individually provided, which are connected in parallel with one another, each being separately constructed for accommodating the entire fluid flow; that is, each of the two fluid pumps 12A and 12B connected in parallel with one another is constructed for 100% of the rated output. The two pumps are each incorporated in a respective pump branch $Z_A$, $Z_B$, the branch $Z_A$ having a series circuit of the following components: a pump control valve V11 on the suction side, the pump 12A itself, a check valve R1 and a pump control valve V12 on the pressure side. Correspondingly, the series circuit of a suction-side pump control valve V21, the pump 12B itself, a check valve R2 and a pressure-side pump control valve V22 is provided in the pump branch $Z_B$. In the pressure line 12.1 external to the reactor and upstream of the line duct 14, two motor-actuated isolating valves 16a, 16b are disposed in line with one another, and in the suction line 12.2 external to the reactor, two motor-actuated isolating valves 17a and 17b are disposed shortly upstream of the line duct 14.

Advantageously, at least two fluid pumps 12A, 12B operating parallel with one another are provided and if one pump malfunctions the other one automatically begins to function, so that the first pump can be isolated by means of its two valves on the pressure and suction sides and then inspected and repaired as needed. In order to increase the serviceability of the entire reactor plant, it may be useful to provide three pump branches $Z_A$, $Z_B$ and $Z_C$ connected in parallel with one another, because in that case two pumps that are capable of functioning will always be available in the event of a pump malfunction.

Figure 3:
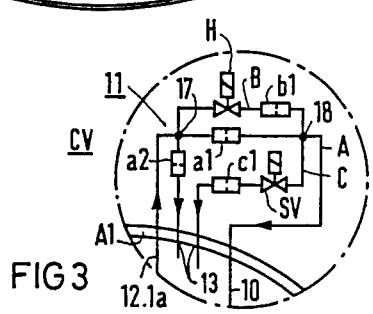
FIG. 3 is a schematic circuit diagram for the portion Y of the circuitry of the control valve assembly of FIG. 1, but having only one control branch assembly CV, which serves to trigger the drive of a control rod, so that the basic principle will be apparent from this simplified circuit.

The control valve assembly 11 for the control rod drive CD shown in detail in the form of a circuit diagram in FIG. 3, has the following control branches for each control rod 6 to be actuated:

1. A holding branch A communicating on the inlet side with the pressure line 12.1a and on the outlet side with the pressure side (fluid line 10) of the piston/cylinder system. The branch A has a first fluid throttle a1 and a bypass fluid throttle a2 connected upstream in terms of the gradient of the first fluid throttle a1 and it discharges into a drain through a bypass line A1. The throttle cross sections of the first fluid throttle a1 and of the bypass fluid throttle a2 are dimensioned in such a way that when the fluid pump 12 is operating they allow the passage of a fluid flow that is sufficient for maintaining a particular control rod 6 in its particular position. When the pump 12 is pumping in a circulatory flow through the bypass fluid throttle a2, a pressure level is produced at the line point 17, and a partial flow is then fed into the holding branch A through the first fluid throttle a1. The bypass fluid throttle also serves the function of ejecting bubbles (venting the hydraulic lines).

2. A raising branch B has a series circuit of a raising valve assembly H and a second fluid throttle b1, wherein two branch ends of the raising branch B are connected to the holding branch A at a connecting point 17 upstream of the first fluid throttle a1 and at a connecting point 18 downstream of the first fluid throttle a1.

3. A lowering branch C has a series circuit of a lowering valve SV and a third fluid throttle c1, wherein the lowering branch C is connected to the holding branch A with one end of the branch C downstream in terms of the drop of the first fluid throttle a1 at the connecting point 18, and with the other end of the branch C discharging into the interior of the pressure vessel 1 like the bypass line a1, that is into the drain or the cooling water reservoir KW, in the form of an outflow line extending through corresponding pressure-tight line ducts 13 through the cap 1.2.

Figure 10:
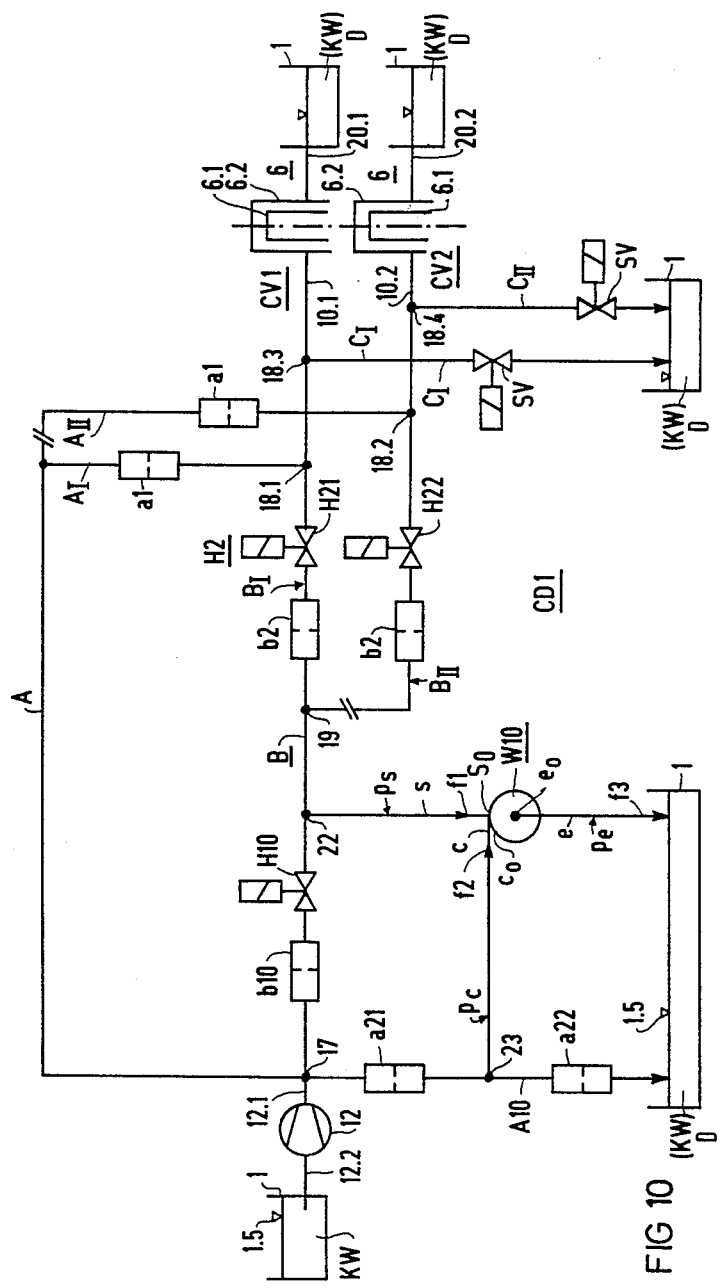
FIG. 10 is a schematic circuit diagram of another embodiment of a hydraulic control branch assembly, in which only the drives for two control rods are shown and the securing of the particular raising branch is effected by means of a turbulence chamber valve that is common to all of the raising branches.
Figure 11:
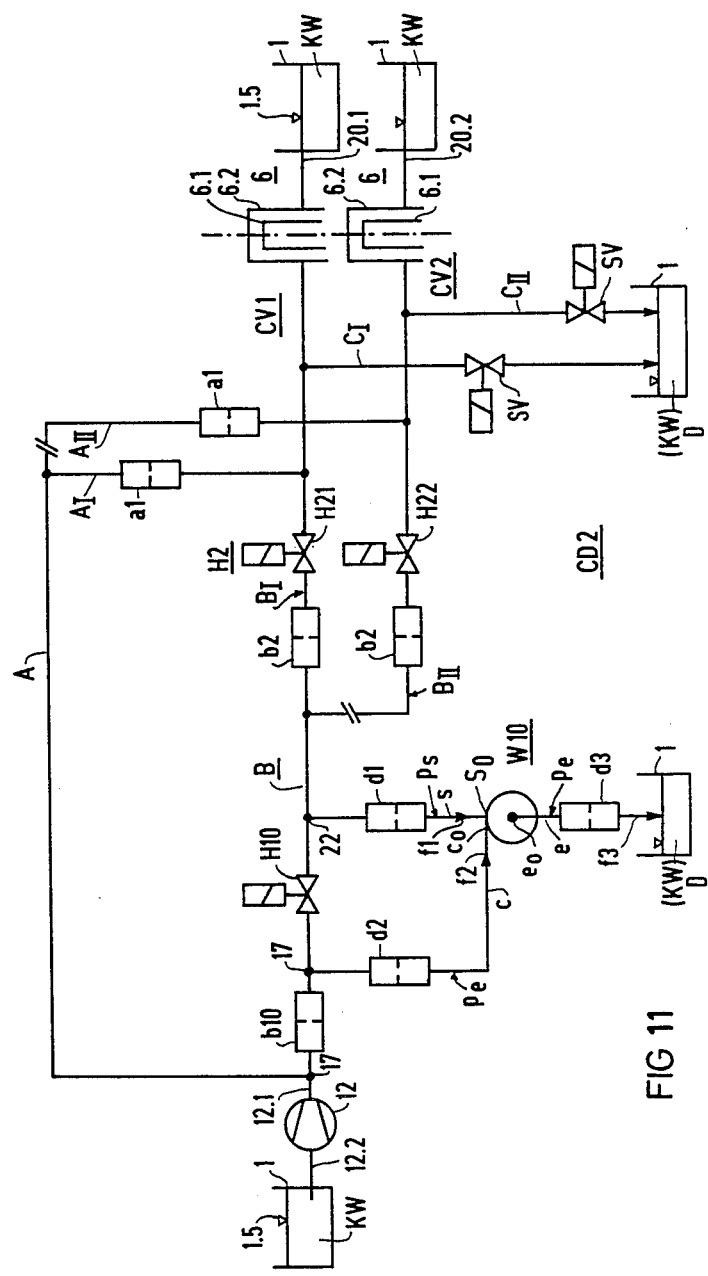
FIG. 11 is a schematic circuit diagram of a variant of the hydraulic circuit according to FIG. 10, in which the disposition of the fluid throttles that determine the hydraulic pilot pressure for the turbulence chamber valve has been somewhat modified.

According to a first provision (a), the control valve assembly 11 includes means for automatically opening the lowering valve SV in the associated lowering branch and/or the respectively operative raising valve assembly H, in the event that an opened raising valve of the raising valve assembly H in one of the raising branches should stick. The automatic opening means are in the form of at least two raising valves H1-H2 in FIG. 5; H10-H2 in FIGS. 6, 10 and 11; H10-W01-H2 in FIG. 7; or W100-H2 in FIG. 12. According to a second provision (b), the raising valves are connected in series with one another so as to reduce the fluid flow through the particular malfunctioning raising branch B, $B_i$ at least far enough so that further raising of the triggered control rod 6 is prevented. By definition, in the simplest case the raising valve assembly H shown in FIG. 3 can also include only a single raising valve, or as shown in the further drawings may include double or triple series circuits having a plurality of raising valves. In the embodiments of FIGS. 10 and 11, double series circuits each including two raising valves H10-H2 are augmented by a turbulence chamber valve W10, which controls the raising fluid flow into the drain KW in the case of a malfunction.

In order to provide the first provision (a), the raising valves H are equipped with position indicators which furnish electrical monitoring signals that are available to the control room. These signals may be obtained, for example, by means of limit switches, which operate inductively or by means of ultra-sound and emit an electrical signal, especially a signal voltage, for both the closing position and the opening position of the raising valve and signals for intermediate positions can be derived as well. In order to monitor the function of the entire control valve assembly 11, it may be useful to provide the lowering valves SV with position indicators as well. Particularly in heating reactors or heavy water moderated pressurized water reactors of relatively high output, of approximately 10 MW$_{th}$ and up, in which the change in the neutron flux density in the core 5 dictated by an undesirable retraction of a control rod or of a small control rod group of up to three control rods remains within allowable limits, the following provision is recommended; The opening time of the particular raising valve is compared with its desired or set-point opening time that is required to attain the desired control rod raising increment. To this end, as shown schematically in FIG. 4, the actual value for the period of time that elapses between the signal "raising valve open" and "raising valve closed", with the actual value being generally symbolized as $t_{a-z}$, is compared with a threshold value $\Delta t_1$ for a desired or set-point opening time period. If this set-point opening time period is exceeded by a predetermined proportion $k.(\Delta t_1)$, where $0 < k < 1$, the associated lowering valve SV is opened. In the diagram shown, the period of time $t_{a-z1}$ is below the set-point opening time period $\Delta t_1$; in other words, a proper closure of the raising valve is taking place. On the other hand, the actual value $t_{a-z2}$ is approximately 30% above the set-point opening time period $\Delta t_1$, and an associated electronic monitoring circuit which is associated with the control valve assembly 11 is set in such a way that after the set-point opening time period $\Delta t_1$ has been exceeded by the proportion $k.(\Delta t_1)$ and thus the tripping SV is opened, the raising command is at least equalized, so that the applicable control rod cannot be retracted farther but instead remains in its position that it has just reached. Naturally, by actuating a larger group of lowering valves SV or all the lowering valves, it is possible to reduce the fluid pressure on the pressure side of the piston/cylinder systems far enough so that all the control rods drop to their lowermost position, that is including the control rod having the raising valve which was malfunctioning in its open position. It is readily possible to set the response threshold time far enough above the set-point opening time period $\Delta t_1$, for example 20–40% higher, that the control rod having the raising valve which is malfunctioning in the open position cannot be retracted significantly farther but instead can be intercepted very quickly. In the illustrated embodiment, a factor k of 0.3 was used. Preferably, $0.3 < k < 1$.

The second embodiment illustrated in FIG. 5 is provided for a hydraulic control rod drive CD01, which is used in heating reactors or heavy water moderated pressurized water reactors of lesser capacity, up to approximately 10 MW$_{th}$. In such relatively small heating reactors or nuclear reactors, the absorber cross section of an individual control rod contributes notably to the entire neutraon capturing cross section, so that an undesirable retraction of even a single control rod must be avoided under all circumstances. This can be accomplished according to FIG. 5 by providing that every control branch assembly, which is shown at reference symbol CV in FIG. 3 and each of which is associated with one control rod 6 in the context of the entire assembly of the hydraulic control rod drive CD, has a series circuit in the raising branch B thereof including at least two raising valves H1, H2, so that if one raising valve H1 or H2 sticks in its open position, the interruption of the raising fluid flow is effected by the other raising valve H2 or H1, and vice-versa. Only two control branch assemblies CV1, CV2 are shown in FIG. 5; it will be understood that a number of control branch assemblies is also to be provided which corresponds to the number of control rods 6. In logical relationship with FIG. 3, the individual holding, raising and lowering branches are correspondingly indicated as $A_I$, $B_I$ and $C_I$ in the control branch assembly CV1 and as $A_{II}$, $B_{II}$ and $C_{II}$ in the control branch assembly CV2. In general, the holding, raising and lowering branches can be designated as $A_i$, $B_i$ and $C_i$, where i (1,2 ... i) identifies the particular individual branch. In this case, reference symbol $A_0$ designates a distributor line common to all of the holding branches and reference symbol A represents the holding branch assembly as an entity. The circuitry structure is otherwise as shown in FIG. 3 and the outflow lines discharging into the plenum or cooling water reservoir are labelled at the ends thereof with a hydraulic symbol D. The likelihood that both of the raising valves H1, H2 connected in series with one another will stick in their open position is very slight; in any case, if this malfunction should occur, all the lowering valves SV would be opened. This need not be done if a so-called turbulence chamber valve is provided as a third raising valve, as a diverting valve or as a turbulence throttle for the respective raising branch B, $B_I$, $B_{II}$, and so forth, as described below referring to FIGS. 7–11. As already noted, the working flow principle is at the basis of the control rod drive; that is, retraction is possible only if the necessary hydraulic pilot pressure is furnished by the pump 12 or pump assembly. That is, if the pump is reduced in its rpm or shut off, the pressure of the working fluid drops and all the control rods reach the inserted position thereof or automatically drop into the inserted position thereof.

As shown in FIG. 6, each control rod of a control rod drive CD02 is assigned one control branch assembly CV1, CV2 etc., in accordance with FIG. 5; however, a pilot raising valve (H1 in FIG. 5) is not provided for each individual control branch assembly, or in other words it is not present in multiple or numerous form; instead, only one such valve is provided, in the form of a master raising valve H10 connected to the input side which is common to all the control branch assemblies CV1, CV2, etc. A fluid throttle b10 is connected in series with the master raising valve H10, in such a manner that when the valve H10 is opened, it allows the fluid flow to pass to each of the individual raising valves H2 downstream thereof, so that whenever a particular control rod is to raised, the applicable raising valve H2 downstream thereof is opened. If that valve were to stick in its open position, or in other words if it could not be closed or it could only be closed after a considerable delay, the master raising valve H10 would be closed and thus all the control rods would remain in the position they have assumed; further movement in the "raising" direction by any one control rod is no longer possible. The designation of the other hydraulic components and lines is the same as in FIG. 5, but a separate connection point 18.1 is provided for each raising branch $B_I$, $B_{II}$ and a separate connection point 18.2 is provided for each lowering branch $C_I$, $C_{II}$, respectively, forming connections with the holding branches $A_I$ or $A_{II}$. The symbols for the fluid throttles a1, a2, b1, c1 are shown somewhat differently in FIG. 5 than in FIGS. 3 and 6, but their meaning is the same.

In the embodiment of the control rod drive of FIG. 6, n−1 fewer raising valves are thus needed, if n is the number of control branch assemblies or control rods to be triggered. It may be useful to combine the control circuit of FIG. 6 with the provisions explained with reference to FIG. 4 for monitoring the position of the raising valves, so that the the precise raising valve which is malfunctioning can be recognized in the control room and in this case an automatic opening of the associated lowering valve can also be provided, so that in the event of the already-closed master raising valve H10, the applicable control rod is lowered into its zero position (inserted position).

Figure 7:
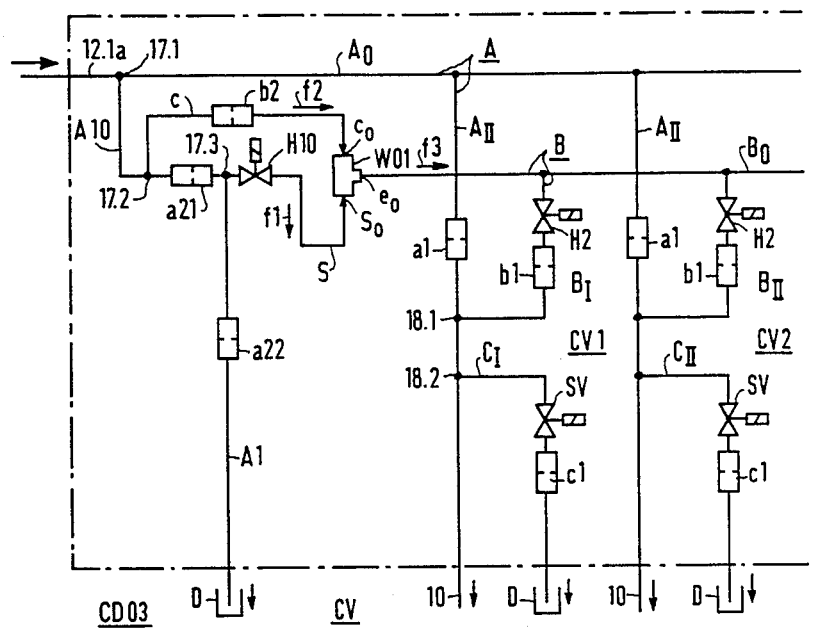
FIG. 7 is a schematic circuit diagram of an embodiment of a hydraulic control branch assembly corresponding to FIG. 6, but with a triple series circuit formed of a pilot master raising valve, a turbulence chamber valve and a raising valve connected downstream in each raising branch.

The hydraulic control branch assemblies provided for the control rod drives CD, CD01 and CD02 shown in FIGS. 3, 5 and 6 undergo further substantial augmentation by means of embodiments of hydraulic control branch assemblies for control rod drives CD03, CD1, CD2 and CD3 shown in FIGS. 7–13. If the circuit of FIG. 7 is compared with that of FIG. 6, it can be seen that the circuit of FIG. 7 agrees with that of FIG. 6 in terms of the embodiment of the control branch assemblies CV1, CV2 etc. (once again, only two control branch assemblies are shown) associated with each individual control rod drive. An expansion and further development of the circuit is provided with respect to the master raising valve H10. The valve H10 is followed by a turbulence chamber valve W01, which has three hydraulic connections $s_o$, $c_o$, $e_o$ for three types of fluid flows, namely a supply flow f1, a control flow f2 and an outlet flow f3. As the drawing shows, the internal, controllable flow path $s_o$-$e_o$ of the turbulence chamber valve W01, which is located between the supply flow inlet $s_o$ thereof and the valve outlet $e_o$ thereof, is disposed in the raising branch B. Reference symbol $B_0$ is once again the distribution line that is common to all of the raising branches $B_I$, $B_{II}$, etc. The control flow f2 of the turbulence chamber valve W01 is supplied thereto through a fluid throttle b2. The throttle b2 is located in the fluid line C, which is connected at a connecting point 17.2 to the line branch A10, which turn is connected at a connecting point 17.1 to the distributor line A of the holding branch.

The series circuit formed of the line branch A10, the fluid throttle a21 and the fluid throttle a22 together produce the bypass branch A1, which discharges into a drain D and provides for the defined adjustment of a fluid flow that keeps the particular control rod in its holding position together with the first fluid throttles A1 in the respective individual holding branches. However, the bypass branch A1 also has the task of assuring a certain pressure level between the two fluid throttles a21 and a22 thereof, that is the pressure level is approximately 5–10% lower at the connecting point 17.3 than the pressure level that is carried on from the connecting point 17.2 through the control flow line C and the fluid throttle b2 to the control flow connection $c_o$ of the turbulence chamber valve W01.

Before giving a detailed discussion of the function of the turbulence chamber valve W01 in the context of the circuit of FIG. 7, an individual turbulence chamber valve shown in FIG. 8 will first be explained. The hydraulic connections $s_o$, $c_o$ and $e_o$ and fluid flows, namely the supply flow f1, the control flow f2 and the outlet flow f3, are designated in the same way as in FIG. 7. Turbulence chamber valves are purely fluidic elements, which operate solely on the basis of hydraulic effects, having no moving parts and requiring no auxiliary energy external to the system. In this regard, see the article, "Konstruktion und Leistung von Wirbelgeräten" (Construction and Output of Turbulence Devices) by H. Brombach in the journal "Messen - Steuern - Regelm" [measurement - control - regulation], VEB Verlag Technik, Berlin, No. 11. November 1978, pages 638-642, in particular pages 641 and 642. The radial turbulence chamber valve shown by way of example in FIG. 8 (axial and conical turbulence chamber valves also exist) is formed of a flat hollow cylindrical turbulence chamber housing 21, which contains a turbulence chamber 21' in the interior thereof, a connector for the supply connection $s_o$ discharging radially into the turbulence chamber 21, a connector for the control flow connection $c_o$ discharging at a tangent into the turbulence chamber 21, and a connector for the outlet flow connection $e_o$ disposed axially with respect to the axis of rotation of the housing 21 or with respect to the turbulence chamber 21'. The connector for the outlet flow f3 may be in the form of a nozzle or Venturi nozzle, as shown, to keep the pressure loss as low as possible. The supply flow f1, shown in dotted lines and supplied through the radially disposed connector $s_o$, leaves the turbulence chamber 21' through an axial connector $e_o$, on the initial condition that no control flow f2 is flowing as yet. The throttling effect of the turbulence chamber valve is then relatively slight, and the supply flow f1 is equal to the outlet flow f3. If a control flow f2 with a control pressure approximately 5-10% higher than the pressure of the supply flow f1 is sent through the tangential connector $c_o$, then an increasingly intensive swirl flow is generated in the turbulence chamber 21' with increasing control flow quantity. If centrifugal force causes the buildup of a counterpressure in the turbulence chamber 21', this causes the inflow of the supply flow f1 to be reduced (or if the control flow decreases again causing the inflow to increase again) so that it can be controlled. A relatively low maximum control flow throughput of approximately 10-20% of the maximal supply flow throughput f1 is sufficient to stop the supply flow f1. The control flow f2 which is represented by dashed lines, flows in spirals from the tangential inlet to the axial connector $e_o$ and propagates the spiral flow in the connector. The arrow f3 of the outlet flow is shown in dot-dash lines in the FIG. 8 embodiment, in order to represent that it includes components of both the control flow f2 and the supply flow f1. However, if the control flow throughput f2 attains the intended maximum of approximately 10-20% of the supply flow f1, then the supply flow comes to a stop. The outlet flow f3 then contains only a control flow, so that the flow then is approximately 20% of the throughput of the blocked-off supply flow f1.

In order to explain the functioning of the circuit of FIG. 7, it is first assumed that the preceding master raising valve H10 is closed and that the raising valves H2 downstream thereof are closed as well. It is also assumed that the control rod drive triggered by the hydraulic control branch CV1 is to be raised by a predetermined number of increments. Specifically, the hydraulic pulse that can be generated by the simultaneous opening of the raising valve H2 downstream and the master raising valve H10 upstream should be sufficient for performing a raising increment that may amount to 20 mm, for example. in other words, the master raising valve H10 and the raising valve H2 downstream thereof are opened at the same time; as a result, the supply flow f1 flows through a line S from the master rising valve through the turbulence chamber valve W01 into the raising branch B, and from there through the raising valve H2 downstream thereof and the fluid throttle b1 (partial branch $B_I$) thereof into the fluid line 10 that is internal to the reactor, to the associated control rod drive. The connection points of the raising branch $B_I$ and of the lowering branch $C_I$ with respect to the fluid line 10 of the holding branch $A_I$ are shown in FIG. 7 with reference symbols 18. 1 and 18.2, respectively.

Figure 9:
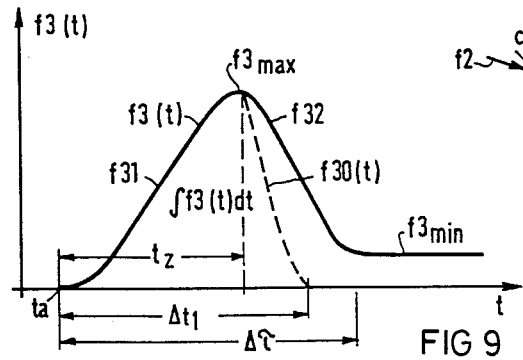
FIG. 9 is a graph in which the course of the outlet flow throughput f3(t) of the turbulence chamber valve is plotted qualitatively on the ordinate axis, as a function of the time t on the abscissa.

For the ensuing explanation, reference is first made to the diagram of FIG. 9. In FIG. 9, the point $t_a$ on the abscissa represents the opening instant of the two raising valves H10 and H2 mentioned above, at which point the turbulence chamber valve is simultaneously triggered as well, so that an outlet flow f3(t) flows at the outlet $e_o$ thereof. The turbulence chamber valve W01 has a characteristic causing the outlet flow f3(t) to behave as indicated by the curve drawn in heavy solid lines, which is to first rise up to a maximum $f3_{max}$ (curve segment f31) and then to drop to a minimal outlet flow $f3_{min}$ (curve segment f32), whenever the control flow f2 begins to have an effect. The period of time from the beginning of flow of the outlet flow f3(t) until the outlet flow drops to the value $f3_{min}$ is shown as $\Delta\tau$. This period of time $\Delta\tau$ can also be referred to as the time constant of the turbulence chamber valve W01. The curve segment f30(t) is intended to clarify the proper closing function of the two raising valves H10 and H2. In other words, if these two raising valves are given a closure command at or shortly after the maximum of the curve f3(t), because the intended raising increment of the control rod has been performed, then the fluid flow as indicated by the curve segment f30(t) drops to zero in accordance with the closing time constant of the two raising valves, so that the set-point opening time period of $\Delta t_1$, for example, is adhered to. This curve course f30(t) would also result if only one of the two valves were to close upon actuation of the two raising valves H10 and H2 in the closing direction. On the other hand, if the inherently very unlikely situation should arise that both of the activated raising valves H10, H2 located in series with one another should stick in their open position even though the closing command had been given from the time $t_z$ on, then the turbulence valve W01 comes into play, and because of the control flow f2 that has its effect with the time constant $\Delta\tau$, the outlet flow f3(t) drops as represented by the curve segment f32 from the value of $f3_{max}$ to the value of $f3_{min}$, the latter value being approximately 10-20% of the original supply flow f1. This value of 10-20% of the supply flow f1 is too low for it to have any effect on the control rod drives in the raising direction. The result is therefore that the outlet flow f3 of the turbulence chamber valve W01 is capable of being reduced to such a fraction of its value in the open position due to the application of a control flow f2, that the operation of raising the control rods is reliably interrupted, that is with a margin of safety as well, due to the thus-reduced fluid flow f3(t) in the raising branch B, $B_I$ or $B_{II}$. The term "margin of safety" is understood in this context to mean that for instance an operation of raising the control rod be cannot triggered until 50% of the normal supply flow throughput f1, so that with the lower value of 10-20% of the normal supply flow for the minimum outlet flow $f3_{min}$, one is on the safe side. It will furthermore be understood that the time constant $\Delta\tau$ of the turbulence chamber valve, that is the period of time that elapses from the onset of the control and supply flow f2, f1 at a time $\Delta\tau=0$ or $t=t_a$ until throttling off the supply flow f2, is matched to the set-point opening time period $\Delta t_1$ of the raising valves H10, H2. This period of time is required for performing a desired maximal allowable raising increment of the applicable control rod, in such a way that in event that both raising valves H10, H2 should stick in their open position after or shortly after attaining the set-point opening time, the raising branch B is automatically throttled off hydraulically, in the direction of interrupting the raising operation, by reducing the outlet flow f3(t) of the turbulence chamber valve W01 to its throttled-off value $f3_{min}$.

The turbulence chamber valve W01 could also be used for each of the individual raising branches $B_I$, $B_{II}$ of the embodiment illustrated in FIG. 5, or in other words multiple turbulence chamber valves could be provided; however, it is particularly advantageous if it is only associated with the master raising valve H10 of FIG. 7 and if it is accordingly dimensioned like the valve H10 for a greater fluid flow. This simplifies the hydraulic circuit considerably, without having to accept sacrifices in terms of safety.

FIG. 7 thus shows a preferred hydraulic circuit of the turbulence chamber valve W01, in which the internal, controllable flow path $s_o$-$e_o$ thereof is located between the outlet of a pilot raising valve, in the form of a master raising valve H10, and the inlet of one of the raising valves H2 downstream thereof of which a multiplicity are connected in parallel with one another. The turbulence chamber valve W01 can easily be dimensioned in such a way that the time constant $\Delta\tau$ thereof is, for example, in the range between 150 and 250 ms. These are also practical delay times, which arise in the execution of control rod raising increments in hydraulic control drives.

In the diagram of FIG. 9, the turbulence chamber valve already throttles down whenever the set-point opening period of time $\Delta t_1$ is exceeded by approximately 20%. Depending on the construction of the control rod drive, $\Delta\tau$ can also be made up to approximately 3 times greater than the value $\Delta t_1$, because the descending segment f32 of the outlet flow course in any case can no longer effect notable shifts of the control rod in the raising direction.

In FIGS. 1 and 2, the fluid pumps 12 are shown as fluid pumps which are external to the reactor. However, it is also possible to structurally unite the fluid pumps with the control valve assembly 11, in which case they would be seated in a pressure-tight housing, encapsulated on the outside of the cap 1.2 of the reactor pressure vessel 1, as is shown in FIG. 2 of German Published, Non-Prosecuted Patent Application DE-OS No. 34 35 584. The length of the pressure and suction lines 12.1, 12.2 can be shortened. However, in the context of the present invention a placement of the fluid pumps 12 external to the reactor is preferred, because of better accessibility and ease of maintenance.

The invention also preferably relates to fuel element and control rod assemblies of the kind in which the control rods have cross-shaped absorber plates which engage the correspondingly cross-shaped interspaces between four adjoining fuel elements, as shown in German Published, Non-Prosecuted Application DE-OS No. 33 45 099. The control rods can also engage interspaces that are provided between the fuel rods inside the fuel elements, for example as shown in U.S. Pat. No. 3,379,619 in a version of pressurized water reactors.

The embodiments described below in connection with FIGS. 10 and 11 are based on the recognition that not only can such turbulence chamber valves be connected in series with the raising the valves in the particular raising branch of the control rods (in which case they block or throttle the raising fluid flow after a predetermined period of time, that is if a raising valve should stick in its open position), but safety circuits for the raising branches of control rod drives of this generic type can also be provided to accomplish a great advantage, in which the turbulence chamber valves in the response situation divert fluid flows from the main fluid flow and direct it into a drain.

It will be understood that in FIG. 10, hydraulic elements or components identical to those in FIGS. 3–8 are identified by the same reference numerals, so that the basic function of the circuit of FIG. 10 is readily apparent. Unlike FIGS. 3–8, two control rods 6 are provided, which symbolically stand for a plurality or multiplicity of such triggered control rods. The outer tube 6.2 of the tubes which are shown as being coaxial with one another is the movable control rod guide tube in each case, which can be moved upward and downward by a non-illustrated piston, and the inner tube is the control rod guide rod 6.1. Reference symbol CV1 indicates the entire control branch assembly associated with the upper control rod, while reference symbol CV2 is the entire control branch assembly associated with the lower control rod 6. One common holding branch A belongs to both control branch assemblies CV1, CV2, etc. The branch A is bifurcated in other partial holding branches $A_I$ or $A_{II}$ for each control branch assembly. The partial holding branches are connected to the partial raising branches $B_I$ or $B_{II}$ at the connecting points 18.1 or 18.2. The holding branch designated as a whole by reference symbol B has a line segment common to all of the holding branch segments, which has the pilot raising valve H10 and the fluid throttle b10 connected to the inlet side of the valve. The entire raising branch B then divides into the individual raising branch segments $B_I$, $B_{II}$, etc. at a circuit point 19, each of these branch segments having a separate raising valve H21, H22, etc. downstream thereof, with an associated fluid throttle b2 upstream thereof. Finally, each control branch assembly CV1, CV2, etc. has a respective lowering branch $C_I$ or $C_{II}$, the latter being respectively connected at connecting points 18.3 and 18.4 to the raising branch segments $B_I$ and $B_{II}$ and through a remote-controlled lowering valve SV establishing communication with the hydraulic drain D if needed, in this case with the cooling water plenum (KW) of the reactor pressure vessel 1. The fluid line 10 shown in FIG. 1, which is internal to the reactor, is also subdivided in accordance with the multiple assembly shown in FIG. 10, where it is identified by reference symbols 10.1 and 10.2. Once the fluid flow supplied to the drives of the control rods 6 through the holding and raising branches A, $A_I$, $A_{II}$ and B, $B_I$, $B_{II}$, has performed its work n the piston/cylinder systems thereof, it is drained out of the control rods into the cooling water plenum, as indicated by respective fluid lines 20.1 and 20.1. The fluid throttles in the holding branch segments $A_I$, $A_{II}$ are again designed by reference symbol a1.

The turbulence chamber valve W01, with the supply line s thereof being connected to the raising branch B at a circuit point 22 between the two raising valves H10 and H2, is connected to the already-explained series circuit H10-H2 including the pilot raising valve and the respective raising valve downstream thereof (as noted, H2 is represented by a multiplicity of separate raising valves H21, H22, etc. downstream thereof). The turbulence chamber valve W01 generally functions in such a way that it reduces the fluid flow in the raising branch B, or in the respective raising branch segment $B_I$, $B_{II}$, etc., whenever the fluid flow flows out for longer than the set-point opening time period $\Delta t_1$ and cannot be blocked off by the series circuit of the raising valves H2-H10 because of a valve malfunction. In this case, the operation of raising the triggered control rod 6 is interrupted immediately. This function of the turbulence chamber valve in a series circuit, with respect to the pilot raising valve and the raising valve downstream thereof, has been described in detail while referring to FIGS. 3-9. This serial connection sets as a precondition for response of the turbulence chamber valve preventing the fluid to flow through the two raising valves in line with one another from being interrupted after the set-point opening time period $\Delta t_1$ has elapsed. On the other hand, in the context of the present invention it is possible to make the turbulence chamber valve respond as soon as one of the two series-connected raising valves H10-H2 malfunctions, particularly the pilot raising valve H10. Before describing the connection and functioning of the turbulence chamber valve W01 in detail, some supplementary remarks are in order regarding the mode of operation of the turbulence valve of FIG. 8. The functions of the control flow f2 and the supply flow f1 can be reversed, so that if the pilot pressure of the supply flow f1 is greater than the pressure of the control flow f2 by a few per cent, for instance 3 to 10%, the supply flow can cancel the blocking swirl flow of th control flow f2 in the turbulence chamber 21' and the inherently blocked turbulence chamber valve then becomes open once again. This last-mentioned function of controlling the degree of opening of the turbulence chamber valve with a dominating supply f1 is utilized in the context of the following two embodiments. The arrow f3 of the outlet flow is shown in dot-dash lines, to indicate that it contains components of both the control flow f2 and the supply flow f1, as noted above. Once the control flow throughput f2 reaches the intended maximum of approximately 10 to 20% of the supply flow f1, the supply flow f1 is overcome, and the turbulence chamber valve closes. The outlet flow f3 therefore contains only the control flow f2, so that by that point approximately 20% of the throughput of the supply flow f1 which is then blocked off is flowing.

Figure 8:
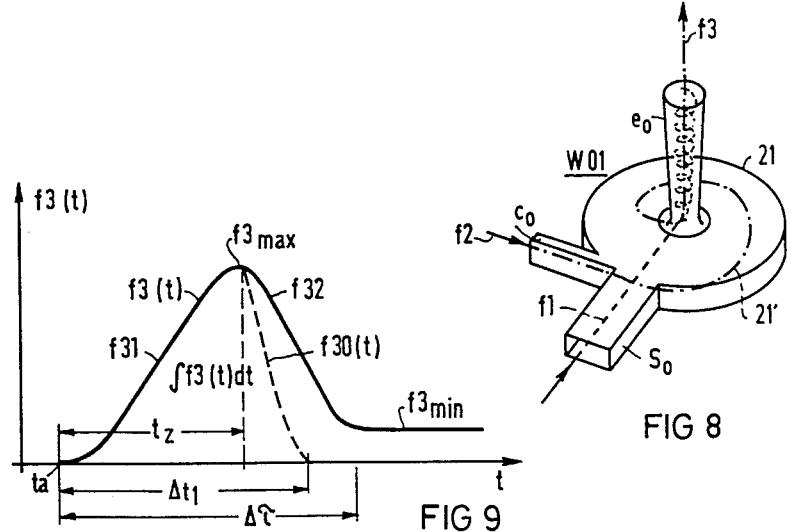
FIG. 8 is a perspective view of an individual turbulence chamber valve of a radial type, intended to provide an explanation of the basic function thereof.

For example, in accordance with the circuit of FIG. 10, the supply line s of the turbulence chamber valve W01 in the version shown in FIG. 8 is connected to the raising branch B at the connecting point 22, that is between the pilot and the raising valves H10, H2 downstream thereof. The outlet line e discharges into a drain or into the cooling water reservoir KW of the pressure vessel 1 and the control line c thereof is connecting to the raising branch B upstream of the pilot raising valve H10 through at least one fluid throttle A21 for generating a hydraulic pressure level $p_c$. As the drawing shows, in order to adjust the control pressure $p_c$ in the control line c, a bypass A10 which discharges into the drain KW and is formed of a series circuit of least two fluid throttles a21, a22, is connected to the raising branch B at the connecting point 17 upstream of the pilot raising valve H10 or of the pressure line 12.1 of the pump 12

The control line begins at a branching point 23 between the two fluid throttles a21 and a22. The pressure level $p_c$ is adjusted in such a way that when the pilot raising valve H10 is closed, the pressure is greater than the pressure level $p_s$ in the supply line s, so that the pressure level $p_c$ thus maintains a blocking swirl flow in the turbulence chamber valve W01. On the other hand when the pilot raising valve H10 is opened, the pressure level $p_c$ in the control line c is lower than the pressure level $p_s$ in the supply line s, so that after a time constant $\Delta \tau$ of the turbulence chamber valve W01 elapses, corresponding to a time period $\Delta t_2$, which is equal to or somewhat greater than the set-point opening time period $\Delta t_1$ of the raising valves H10, H2 for performing a desired maximally allowable raising increment, the blocking effect of the control flow f2 is cancelled by the supply flow f1, and the majority of the fluid flow in the raising branch B is diverted as a supply flow f1 through the opened turbulence chamber valve W01 into the drain KW so as to interrupt the raising operation. The remaining mass flow, which can therefore continue to flow through the raising branch B for driving the applicable control rod 6 (on the condition that an associated following raising valve H2 is also malfunctioning), is no longer sufficient to maintain or initiate a raising operation. The various states will be described below once again, for the sake of a better understanding of the mode of operation.

(a) Floating or Holding Status (Normal Operation):

Both raising valves H10 and H2 (or the applicable raising valve H21 or H22 downstream thereof) are closed. The fluid flow necessary for holding the control rod 6 flows through the holding branch A. In the bypass branch A10, the throttles a21 and a22 are selected in such a way that a slightly higher pressure $p_c$ is established in the control line c than in the supply line s (pressure $p_s$) and the fluid flow through the turbulence chamber valve W01 from the tangential inlet $c_o$ to the axial outlet $e_o$ is sufficient to establish the required blocking state. As already noted, the meaning of the term "blocking state" is an follows: flow turbulence is built up and no fluid flow occurs from the supply line s to the outlet line e. If an overpressure which may be present from the closed-off tubular volume between the two raising valves H10 and H2 has been reduced or relieved through the turbulence chamber valve from s to e, then a swirl flow or turbulence can built up in the turbulence chamber 21' (see FIG. 8) and the turbulence chamber valve W01 performs a blocking function.

(b) Raising Operation (Normal Operation):

The valves H10 and H2 are opened simultaneously and are kept open for a short period of time $\Delta t_1 < \Delta t_2$ ($\Delta t_2$ is the time after which the blocking state in the turbulence chamber valve is cancelled), until such time as the raising mass flow necessary for raising into the next stage has flowed long enough, in addition to the floating or holding mass flow. During this time period $\Delta t_1$, although the pressure $p_s$ in the supply line s is greater than the pressure $p_c$ in the control line c, is not in a position to completely dissipate the turbulence in the turbulence chamber 21' (which is the cause for the blocking state).

(c) Raising Operation (Assuming a Defect in the Two Valves H10 and H2):

The two series-connected valves H10 and H2 remain opened for a period of time $\Delta t_2 > \Delta t_1$. At the onset of a raising operation, a pressure $p_s$ is established in the supply line s, which is very much higher than the pressure $p_c$ in the control flow line c. If this pressure $p_s$ can act for a relatively long period (which is at least $\Delta t_2$ or more) upon the $s_o$ inlet of the turbulence chamber valve W01 the blocking state will then build up more or less rapidly. Finally, if the turbulence previously built up in the floating state (see the above-described operating state a) can no longer be maintained, then a flow path from the supply line s through the turbulence chamber to the outlet line e is opened up. This path, with its radial inflow and axial outflow, has a very low pressure-loss coefficient and as a result of the ensuing slight flow resistance, it enables the majority of the raising mass flow to flow out into the drain or into the plenum KW. The pressure loss at the throttle b10 and at the valve H10 increases through the bypass $s_o$-$e_o$ which is now open, because of an increased mass flow of the fluid. The pressure $p_s$ in the supply line s can drop to slightly below the pressure $p_c$ in the control line c (even then it is still greater than the pressure at the connecting point 18.1 downstream of the following raising valve H2, but it is possible to construct the turbulence chamber valve W01 in such a way as to prevent a turbulence from building up once again in this state through the inlet $c_o$. Thus a further raising operation is now no longer possible.

(d) Pilot Raising Valve H10 Defective and Following Raising Valve H2 Closed:

If the valve H10 continuously remains open, then after a period of time $\geq \Delta t_2$, the turbulence in the turbulence chamber 21' can be broken down by means of the pressure $p_s$ prevailing in the supply line s, which is higher than the pressure $p_c$ in the control line c, and the flow path $s_o$-$e_o$ through the turbulence chamber is opened up. If the valve H2 is then opened, no raising operation is possible.

(e) Following Raising Valve H2 Defective and Pilot Raising Valve H10 Closed:

If the raising valve H2 continuously remains open, then the pressure from the outlet of the raising branch segments $A_1$ or $A_2$ (connecting point 18.1) or a lower pressure will be established in the supply line s. Depending on the valve construction, the turbulence chamber valve W10 will remain in the blocking state or will allow a small proportion of the floating volume flow or holding mass flow to flow out.

In the second embodiment illustrated in FIG. 11, the control flow line c and the supply line s of the turbulence chamber valve W01 are connected to the raising branch B directly upstream and downstream of the pilot raising valve H10 through respective fluid throttles d2 and d1, which serve the purpose of pressure equalization. A further fluid throttle d3 that suitably serves the purpose of pressure equalization is also disposed in the outlet line e of the turbulence chamber valve W01, as shown. Otherwise, the hydraulic control rod drive CD2 of FIG. 1 does not differ from the control rod drive CD1 shown in FIG. 6. The special feature of this embodiment of the control rod drive CD2 is that during the raising operation, with an assumed defect of the two raising valves H10 and H2 after the period of time $\geq \Delta t_2$, the pressure difference between the control flow line c and the supply line s is substantially determined only by the valve H10 and thus is quite small; the fluid throttles d1, d2 and d3 serve only to provide fine equalization. As a result, the pressure ratio $(p_c - p_e)/(p_s - p_e)$, which is important for the valve construction and where $p_e$ is the pressure in the outlet line downstream of the turbulence chamber valve W01, remains virtually constant from the first moment in which the two serial raising valves H10, H2 are opened (at which time the turbulence valve W01 is still in the blocking state) until the state of a completely dissipated turbulence or swirl flow (bypass $s_o$-$e_o$ fully opened). Otherwise the function of the turbulence chamber valve W01 along with its hydraulic circuitry is like that described above in connection with the circuit CD1 of FIG. 10. Since the segment c-e of the turbulence chamber valve W01 is opened in the circuit CD2 of FIG. 11 in the floating or holding state (normal operation), as described in paragraph (a) of the description of FIG. 10 (that is, a control flow f2 flows into the outlet line 3), the pressure drop at the fluid throttles d2 and d3 and the pressure drop at the fluid throttle b10 upstream thereof and the internal pressure drop in the segment $c_o$-$e_o$ within the turbulence chamber 21' must be taken into account for the hydraulic dimensioning of the holding or floating segment a. This means that in this kind of normal operation, the turbulence chamber W01 functions like a normal fluid throttle inside a bypass branch leading to the drain KW in series with the fluid throttles b10, d2 and d3.

In FIGS. 10 and 11, only one fluid pump 12 is shown, in order to illustrate that the hydraulic control rod drive CD1 or CD2 according to the invention functions with one fluid pump. However, it is more advantageous to improve the redundancy with at least two parallel-connected fluid pumps as already shown and explained in connection with FIG. 2.

Figure 12:
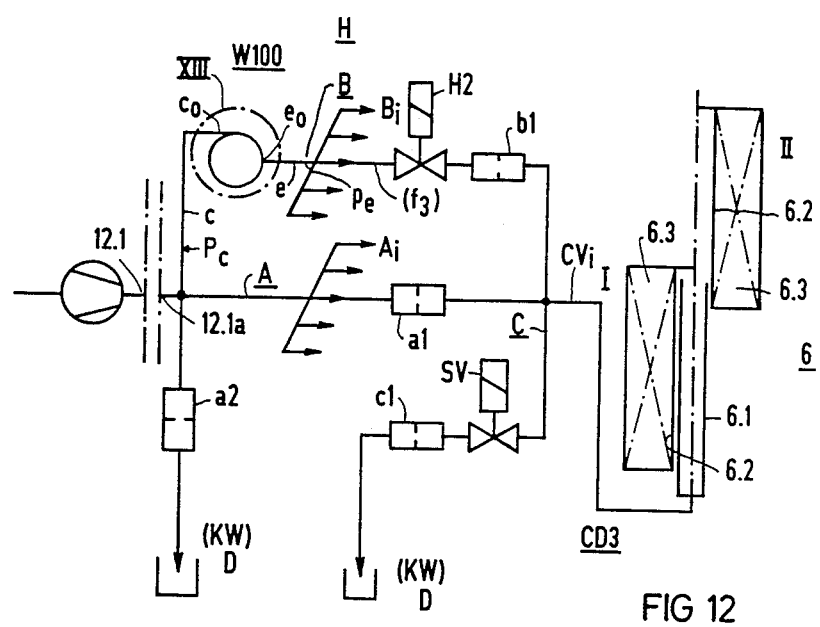
FIG. 12 is a schematic circuit diagram of a control branch assembly having a turbulence valve in the form of a turbulence throttle, which enables a particularly simple structure of the control rod drive CD3 to be provided.
Figure 13:
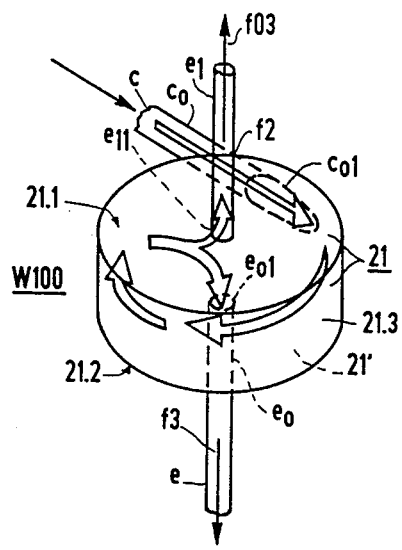
FIG. 13 is a highly simplified perspective view of the portion XIII of FIG. 12.

In the final embodiment illustrated in FIGS. 12 and 13, the valve W100 of at least two series-connected raising valves W100 and H2 of the raising valve assembly H seen in FIG. 12, is a turbulence throttle. The basic layout of the control branch assembly CV for the control rod drive identified as a whole in FIG. 12 by the reference symbol CD3, is like that explained above in connection with FIG. 3 or FIG. 6; that is, once again a main holding branch A having holding branch segments $A_i$ and a main raising branch B having raising branch segments $B_i$ are provided. A single main lowering branch C is also provided in this case, which is common to all of the control branch assemblies $CV_i$. A single representative and diagrammatically illustrated control rod is shown in two positions, that is, a lower inserted position I of absorber plates 6.3 thereof and a retracted or partially retracted upper position II. Once again, reference symbol 6.1 represents a control rod guide rod, and 6.2 represents a control rod guide tube, the latter having a non-illustrated piston/cylinder assembly associated therewith, as already explained in connection with FIG. 1.

FIG. 13 shows the turbulence throttle W100 on a larger scale and in a diagrammatic form, with a housing surrounding a cylindrical turbulence chamber 21', a connection or connector $c_o$ discharging through a tangential nozzle $c_{o1}$ into the turbulence chamber 21' and being connected to a circumferential housing wall 21.3, the connector being intended for a control flow line c, and a connecting line e and a connector $e_o$ communicating with the turbulence chamber 21' through an axial nozzle $e_{o1}$ and being connected to the end wall 21.2 of the housing (the lower wall as seen in the drawing). The upper end wall of the housing in the figure is shown at reference symbol 21.1. A further outlet line $e_1$ with a smaller cross section than the outlet line e is connected to the end wall of the housing opposite the axial nozzle $e_{o1}$ of the outlet line e. The further outlet line $e_1$ serves as a vent line for removing expansion water. The other non-illustrated end of the line communicates with a hydraulic drain, in other words with the cooling water reservoir KW of the reactor pressure vessel 1.

This kind of turbulence throttle W100 is a passive fluidic resistor. A swirl flow is imposed on the fluid in the turbulence chamber 21', through the tangential control line c coming from the pump pressure line 12.1 or 12.1a in FIG. 12. Such a swirl is also referred to as turbulence. The flow paths of the this kind of turbulence are logarithmic spirals. Due to the low-loss acceleration of the fluid particles, high tangential speeds and therefore high centrifugal forces are produced near the axial outlet nozzle $e_{o1}$. The centrifugal force generates a counterpressure, which keeps the flow into the turbulence chamber small. The turbulent core of a fluid-driven turbulence throttle of this kind, which is subject to negative pressure, fills with vapor or gas. The flow resistance of the turbulence throttle W100 from $c_o$ to $e_o$ with the turbulence built up is designated by reference symbol $Z_2$. The flow resistance $Z_2$ is greater by a factor $k'$ than the flow resistance $Z_1$ of the turbulence throttle that is present when the fluid flow through the control line c has just ben initiated and a turbulence has not yet built up. This kind of turbulence throttle W100 can be constructed in such a way that the factor $k'$ may, for instance, be located in the range between 5 and 20. The flow arrows shown in FIG. 13 symbolize a state in which a turbulence is just building up, so that the still relatively low flow resistance $Z_1$ is present. In other words, the majority of the arriving control flow f2 flows as an outlet flow f3 to the raising valve H2. Once the turbulence has built up in the turbulence chamber 21', approximately 10 to a maximum of 20% of the control flow f2 flows through the axial outlet line e to the raising valve H2; this quantity of fluid is not sufficient to bring about further raising of the control rod 6 (FIG. 6) with its absorber plates 6.3.

The function of the circuit shown in FIG. 12 is as follows: if one of the selected control rods 6 is to be raised by one increment or incremental unit, then its associated raising valve H2 in the associated raising branch segment $B_i$ is opened. The fluid flow which therefore begins to be fed from the top pressure line 12.1, 12.1a, causes a flow to be produced from the control connection $c_o$ to the outlet $e_o$ in the turbulence throttle W100, and this internal flow in the turbulence throttle is driven by the pressure drop $(p_c - p_3) > 0$. Since a turbulence has not yet completely built up inside the turbulence throttle W100 during the set-point opening time period $\Delta t_1$ of the raising valve H2, which may, for instance, amount to 200 ms, the flow resistance of the turbulence throttle is at the relatively low value $Z_1$. The control rod 6 thus is lent a sufficiently large impetus or receives a sufficiently large fluid flow amount to execute the desired raising increment. Once the set-point opening time period $\Delta t_1$ has elapsed, the normal situation is that the raising valve H2 closes. Thus the outlet flow f3 of the turbulence throttle is interrupted, and the turbulence that is in the process of being created collapses, so only air or gases and possibly some expansion water can then flow through the second outlet line $e_{1]l}$. On the other hand, if the raising value H2 is still in its opening position after the elapse of a set-point opening time period $\Delta_{t1}$, despite a command to close, or in other words if it is sticking, then the fluid flow f3 (which is shown in brackets to symbolize this abnormal state) can continue to flow until the time period $\Delta t_2$ has elapsed, which is somewhat longer than $\Delta t_1$, such as by 20-30%. After the time period $\Delta t_2$ has elapsed, the turbulence inside the turbulence chamber 21' seen in FIG. 13 has fully developed, so that the increased flow resistance Z then prevails, by means of which the outlet flow f3 is reduced, for instance, to 10% of its maximal value; thus this outlet flow is no longer suitable, or is ineffective for raising the control rod 6. In the control room, the remote position indicator shows that the associated raising valve H2 has not assumed its closing position, so that suitable repair measures or a change of the malfunctioning raising valve can be performed.

Similar to the serial turbulence chamber valve W01, the turbulence throttle W100 is preferably also common to a multiplicity of control branch assemblies $CV_i$ and a correspondingly multiplicity of raising branch segments $B_i$. In the case of the turbulence throttle W100, a relatively simple series circuit results, because this turbulence throttle combines both the function of a normal pilot raising valve and the function of the controllable flow resistance within itself. The redundant series circuit is accordingly formed by the "pilot" turbulence throttle and one of each of the raising valve H2 downstream thereof in the associated raising branch segments $B_i$ located parallel to one another.

We claim:

1. In a water-cooled nuclear reactor including:
   a reactor pressure vessel (1);
   a reactor core (5) supported the reactor pressure vessel (1) including a fuel element cluster (5.0) disposed in an upright position, the fuel element cluster including fuel elements (5.1, 5.2) spaced apart in the reactor core defining interspaces inside and between the fuel rods, control rods (6), drive means for inserting the control rods in the direction of the force of gravity and retracting the control rods against the force of gravity in the interspaces, and a supporting structure for the fuel elements, the control rods and the drive means;
   the control rods (6) having guide rods (6.1) with hydraulic piston/cylinder systems, fluid lines (10) inside the reactor feeding a working fluid in the form of cooling water to the guide rods from below, and a hydraulic drain in the form of a cooling water reservoir (KW) in the reactor pressure vessel (1); and
   a fluid pump asssembly (12) having a pressure side and a suction side, suction lines (12.2, 12.2a), pressure lines (12.1, 12.1a) and associated line ducts (14, 15), connecting the pressure side of the fluid pump assembly (12) with the piston/cylinder systems and connecting the suction side of the fluid pump assembly with the cooling water reservoir (KW);
   the improvement comprising a hydraulic control rod drive assembly (CD) having at least one control rod drive, including:
   a control valve assembly (11) disposed outside the reactor pressure vessel (1) and connected to the fluid lines (10) and the pressure lines (12.1, 12.1a), for influencing the fluid quantity on the pressure side of the fluid pump assembly (12) in order to adjust the control rods (6) in a raising and a lowering direction and to maintain a control rod position;
   the control valve assembly (11) including the following control branches for actuating each of the control rods (6):
   a holding branch (A) having an inlet side connected to the pressure line (12.1a) and an outlet side connected to the pressure side of the piston/cylinder system, a first fluid throttle (a1), and a bypass fluid throttle (a2) disposed upstream of said first fluid throttle relative to a drop of said first fluid throttle for discharging into the drain, said first fluid throttle (a1) and said bypass fluid throttle (a2) having throttle cross sections dimensioned for allowing a fluid flow therethrough sufficient to hold a given control rod (6) in a given position with the fluid pump assembly (12A or 12B) running;

a raising branch (B) having ends respectively connected to said holding branch (A) upstream and downstream of said first fluid throttle (a1), and a series circuit having a raising valve assembly (H) and a second fluid throttle (b1); and a lowering branch (C) having one end connected to said holding branch (A) downstream of said first fluid throttle (a1) relative to the drop of said first fluid throttle (a1), another end discharging into the cooling water reservoir (KW), and a series circuit of a lowering valve (SV) and a third fluid throttle (C1);

means for automatically opening said lowering valve (SV) in said lowering branch (C) if said raising valve (H) in said raising branch (B) sticks in an open position;

said raising vale assembly (H; H1, H2, H10) and said lowering valve (SV) including position indicators furnishing monitoring signals for a control room, and means for comparing an opening time of a given raising valve assembly (H; H1, H2, H10) with a desired opening time required for attaining a desired control rod raising increment, said comparing means including means for comparing an actual value of a period of time ($t_{a-z}$) elapsing between the issuance of a raising valve open signal and the issuance of a raising valve closed signal with a threshold value ($\Delta t_1$) of a desired opening time period, and said comparing means including means for opening said lowering valve (SV) if said desired opening time period is exceeded by a predetermined component $k.(\Delta t_1)$, where $0 < k < 1$.

2. Hydraulic control rod drive assembly according to claim 1, wherein $0.3 < k < 1$.

3. In a water-cooled nuclear reactor including:
a reactor pressure vessel (1);
a reactor core (5) supported the reactor pressure vessel (1) including a fuel element cluster (5.0) disposed in an upright position, the fuel element cluster including fuel elements (5.1, 5.2) spaced apart in the reactor core defining interspaces inside and between the fuel rods, control rods (6), drive means for inserting the control rods in the direction of the force of gravity and retracting the control rods against the force of gravity in the interspaces, and a supporting structure for the fuel elements, the control rods and the drive means;
the control rods (6) having guide rods (6.1) with hydraulic piston/cylinder systems, fluid lines (10) inside the reactor feeding a working fluid in the form of cooling water to the guide rods from below, and a hydraulic drain in the form of a cooling water reservoir (KW) in the reactor pressure vessel (1); and
a fluid pump assembly (12) having a pressure side and a suction side, suction lines (12.2, 12.2a), pressure lines (12.1, 12.1a) and associated line ducts (14, 15) connecting the pressure side of the fluid pump assembly (12) with the piston/cylinder systems and connecting the suction side of the fluid pump assembly with the cooling water reservoir (K);

the improvement comprising a hydraulic control rod drive assembly (CD) having at least one control rod drive, including:

a control valve assembly (11) disposed outside the reactor pressure vessel (1) and connected to the fluid lines (10) and the pressure lines (12.1, 12.1a), for influencing the fluid quantity on the pressure side of the fluid pump assembly (12) in order to adjust the control rods (6) in a raising and a lowering direction and to maintain a control rod position;

the control valve assembly (11) including the following control branches for actuating each of the control rods (6):

a holding branch (a) having an inlet side connected to the pressure line (12.1a) and an outlet side connected to the pressure side of the piston/cylinder system, a first fluid throttle (a1), and a bypass fluid throttle (a2) disposed upstream of said first fluid throttle relative to a drop of said first fluid throttle for discharging into the drain, said first fluid throttle (a1) and said bypass fluid throttle (a2) having throttle cross sections dimensioned for allowing a fluid flow therethrough sufficient to hold a given control rod (6) in a given position with the fluid pump assembly (12A or 12B) running;

a raising branch (B) having ends respectively connected to said holding branch (A) upstream and downstream of said first fluid throttle (a1), and a series circuit having a raising valve assembly (H) and a second fluid throttle (b1); and a lowering branch (C) having one end connected to said holding branch (A) downstream of said first fluid throttle (a1) relative to the drop of said first fluid throttle (a1), another end discharging into the cooling water reservoir (KW), and a series circuit of a lowering valve (SV) and a third fluid throttle (c1);

and means for automatically opening said lowering valve (SV) in said lowering branch (C) if said raising valve (H) in said raising branch (B) sticks in an open position;

said raising valve assembly (H) including at least two raising valves (H1, H2; H10, H2; H10, W01, H2; W100, H2) connected in series with one another for reducing a fluid flow through said raising branch (B, B;) if said raising branch is malfunctioning, at least enough to prevent further raising of a control rod being controlled;

said raising valve assembly (H) in said raising branch (B, BI) further including at least two raising valves connected in series with one another, in the form of a pilot raising valve (H1, H10) and a raising valve (h2) connected downstream of said pilot raising valve for interrupting a raising fluid flow through one of said raising valves (H2, H1 or H2, H10) if the other of said raising valves (H1, H2 or H10, H2) sticks in an open position.

4. Hydraulic control rod drive assembly according to claim 3, including at least one other control rod drive having a raising branch with a raising valve, said pilot raising valve being a master raising valve (H10) having an associated fluid throttle (b10) and being connected upstream of said raising branches (B).

5. In a water-cooled nuclear reactor including:
a reactor pressure vessel (1);

a reactor core (5) supported the reactor pressure vessel (1) including a fuel element cluster (5.0) disposed in an upright position, the fuel element cluster including fuel elements (5.1, 5.2) spaced apart in the reactor core defining interspaces inside and between the fuel rods, control rods (6), drive means for inserting the control rods in the direction of the force of gravity and retracting the control rods against the force of gravity in the interspaces, and a supporting structure for the fuel elements, the control rods and the drive means;

the control rods (6) having guide rods (6.1) with hydraulic piston/cylinder systems, fluid lines (10) inside the reactor feeding a working fluid in the form of cooling water to the guide rods from below, and a hydraulic drain in the form of a cooling water reservoir (KW) in the reactor pressure vessel (1); and a fluid pump assembly (12) having a pressure side and a suction side, suction lines (12.2, 12.2a), pressure lines (12.1, 12.1a) and associated line ducts (14, 15) connecting the pressure side of the fluid pump assembly (12) with the piston/cylinder systems and connecting the suction side of the fluid pump assembly with the cooling water reservoir (KW);

the improvement comprising a hydraulic control rod drive assembly (CD) having at least one control rod drive, including:

a control valve assembly (11) disposed outside the reactor pressure vessel (1) and connected to the fluid lines (10) and the pressure lines (12.1, 12.1a), for influencing the fluid quantity on the pressure side of the fluid pump assembly (12) in order to adjust the control rods (6) in a raising and a lowering direction and to maintain a control rod position;

the control valve assembly (11) including the following control branches for actuating each of the control rods (6);

a holding branch (A) having an inlet side connected to the pressure line (12.1a) and an outlet side connected to the pressure side of the piston/cylinder system, a first fluid throttle (a1), and a bypass fluid throttle (a2) disposed upstream of said first fluid throttle relative to a drop of said first fluid throttle for discharging into the drain, said first fluid throttle (a1) and said bypass fluid throttle (a2) having throttle cross sections dimensioned for allowing a fluid flow therethrough sufficient to hold a given control rod (6) in a given position with the fluid pump assembly (12A or 12B) running;

a raising branch (B) having ends respectively connected to said holding branch (A) upstream and downstream of said first fluid throttle (a1), and a series circuit having a raising valve assembly (H) and a second fluid throttle (b1); and a lowering branch (C) having one end connected to said holding branch (A) downstream of said first fluid throttle (a1) relative to the drop of said first fluid throttle (a1), another end discharging into the cooling water reservoir (K), and a series circuit of a lowering valve (SV) and a third fluid throttle (c1);

and means for automatically opening said lowering valve (SV) in said lowering branch (C) if said raising valve (H) in said raising branch (B) sticks in an open position;

said raising valve assembly including at least two raising valves connected in series with one another in said raising branch in the form of a pilot raising valve and a raising valve (H1, H10; H2) connected downstream of said pilot raising valve, said raising valves both being opened for performing a raising increment for the control rod, at least one of said raising valves being movable into a closing position for terminating said raising increment, and each of said raising valves closing if the other of said raising valves sticks in an open position;

a turbulence chamber valve (W01) connected downstream of one of said raising valves (H1, H10; H2) in said raising branch (B), said turbulence chamber valve (W01) having three hydraulic connections ($s_0$, $C_0$, $e_0$) in the form of an inlet ($s_o$) for a supply flow (f1), an inlet ($c_o$) for a control flow (f2) and an outlet ($e_o$) for a valve outlet flow (f3), said turbulence chamber valve (W01) having an internal controllable flow path ($s_o$-$e_o$) between said supply flow inlet ($s_o$) and said valve outlet ($e_o$), said control flow (f2) reducing said outlet flow (f3) to a fraction of said outlet flow (f3) ($f3_{max}$) in an opening position sufficiently small to interrupt raising of the control rod (6);

a hydraulic control line (c) supplying a hydraulic control flow (f2) to said control flow inlet ($c_0$) of said turbulence chamber valve (W01), said control flow (f2) having a control pressure higher than the supply pressure of said supply flow (f1) by substantially 5–10%; and said turbulence chamber valve (W01) having a time constant $\Delta \tau$ equal to a period of time elapsing from a time $\Delta \tau = 0$ at the onset of said control and said supply flows (f2, f1) until blocking off said supply flow (f1), said period of time being matched to a desired opening time period ($\Delta t_1$) of said raising valves necessary for executing a desired maximally allowable raising increment of the control rod, for automatically hydraulically throttling off said raising branch (B) and interrupting raising of the control rod by reducing said outlet flow (f3) of said turbulence chamber valve (W01) to a throttled-down value ($f3_{min}$) thereof, in the event that both raising valves (H10, H1; H2) stick in an open position after reaching said desired opening time period ($\Delta t_1$).

6. Hydraulic control rod drive assembly according to claim 5, wherein said pilot raising valve (H10, H1) has an outlet, said raising valve (H2) disposed downstream of said pilot raising valve has an inlet, and said internal controllable flow path ($s_o$-$c_o$) of said turbulence chamber valve (W01) in said raising branch (B; $B_I$, $B_{II}$) is connected between said outlet of said pilot raising valve (H10, H1) and said inlet of said raising valve (H2) disposed downstream of said pilot raising valve.

7. In a water-cooled nuclear reactor including:
a reactor pressure vessel (1);
a reactor core (5) supported the reactor pressure vessel (1) including a fuel element cluster (5.0) disposed in an upright position, the fuel element cluster including fuel elements (5.1, 5.2) spaced apart in the reactor core defining interspaces inside and between the fuel rods, control rods (6), drive means for inserting the control rods in the direction of the force of gravity and retracting the control rods against the force of gravity in the interspaces, and a supporting structure for the fuel elements, the control rods and the drive means;

the control rods (6) having guide rods (6.1) with hydraulic piston/cylinder systems. Fluid lines (10) inside the reactor feeding a working fluid in the form of cooling water to the guide rods from below, and a hydraulic drain in the form of a cooling water reservoir (K) in the reactor pressure vessel (1); and a fluid pump assembly (12) having a pressure side and a suction side, suction lines (12.2, 12,2a), pressure lines (12.1, 12.1a) and associated line ducts (14, 15) connecting the pressure side of the fluid pump assembly (12) with the piston/cylinder systems and connecting the suction side of the fluid pump assembly with the cooling water reservoir (KW);

the improvement comprising a hydraulic control rod drive assembly (CD) having at least one control rod drive, including:

a control valve assembly (11) dispose outside the reactor pressure vessel (1) and connected to the fluid lines (10) and the pressure lines (12.1, 12.1a), for influencing the fluid quantity on the pressure side of the fluid pump assembly (12) in order to adjust the control rods (6) in a raising and a lowering direction and to maintain a control rod position;

the control valve assembly (11) including the following control branches for actuating each of the control rods (6): a holding branch (A) having an inlet side connected to the pressure line (12.1a) and an outlet side connected to the pressure side of the piston/cylinder system, a first fluid throttle (a1), and a bypass fluid throttle (a2) disposed upstream of sad first fluid throttle relative to a drop of said first fluid throttle for discharging into the drain, said first fluid throttle (a1) and said bypass fluid throttle (a2) having throttle cross sections dimensioned for allowing a fluid flow therethrough sufficient to hold a given control rod (6) in a given position with the fluid pump assembly (12A or 12B) running;

a raising branch (B) having ends respectively connected to said holding branch (A) upstream and downstream of said first fluid throttle (a1), and a series circuit having a raising valve assembly (H) and a second fluid throttle (b1); and a lowering branch (C) having one end connected to said holding branch (A0 downstream of said first fluid throttle (a1) relative to the drop of said first fluid throttle (a1), another end discharging into the cooling water reservoir (KW), and a series circuit of a lowering valve (SV) and a third fluid throttle (c1);

and means for automatically opening said lowering valve (SV) in said lowering branch (C) if said raising valve (H) in said raising branch (B) sticks in an open position;

said raising valve assembly including another series circuit having a pilot raising valve (H10) and a raising valve (H2) connected downstream of said pilot raising valve, at least one turbulence chamber valve connected to said other series circuit for reducing a fluid flow in said raising branch, said fluid flow being supplied during a desired opening time period of said raising valves for triggering the piston/cylinder system for execution a raising increment of the control rod, said fluid flow supplied after said desired opening time period is exceeded or at least one raising valve sticks being at least sufficient to interrupt raising the control rod, and said tubulence chamber valve having three hydraulic connections in the form of an inlet ($s_o$) for a supply flow (f1), an inlet ($c_o$) for a control flow (f2) and an outlet ($e_o$) for a valve outlet flow (f3);

said turbulence chamber valve (W10) having a supply line (s) connected from said supply flow inlet to said raising branch (B) between said raising valves (H10 or H2), an outlet line (e) discharging from said valve outlet into the drain and a control line (c) connected from said control flow inlet to said raising branch (B) upstream of said pilot raising valve (H10), at least one fluid throttle disposed between said control line (c) and said pilot raising valve for producing a hydraulic pressure level ($p_c$) being greater than the pressure level ($p_s$) in said supply line (s) in the supply line (s) when the pilot raising valve (H10) is opened for canceling a blocking action of said control flow (f2) by said supply flow (f1) and diverting a majority of the fluid flow in said raising branch into the drain as a supply flow through said opened turbulence chamber valve for interrupting raising of the control rod, after a time period ($\Delta t_2$) corresponding to a time constant ($\Delta \tau$) of said turbulence chamber valve (W10) has elapsed, said time period being greater than a desired opening time period ($\Delta t_1$) of said raising valves (H10; H2), for executing a desired, maximally allowable raising increment.

8. In a water-cooled nuclear reactor including:

a reactor pressure vessel (1);

a reactor core (5) supported the reactor pressure vessel (1) including a fuel element cluster (5.0) disposed in an upright position, the fuel element cluster including fuel elements (5.1, 5.2) spaced apart in the reactor core defining interspaces inside and between the fuel rods, control rods (6), drive means for inserting the control rods in the direction of the force of gravity and retracting the control rods against the force of gravity in the interspaces, and a supporting structure for the fuel elements, the control rods and the drive means;

the control rods (6) having guide rods (6.1) with hydraulic piston/cylinder systems, fluid lines (10) inside the reactor feeding a working fluid in the form of cooling water to the guide rods from below, and a hydraulic drain in the form of a cooling water reservoir (KW) in the reactor pressure vessel (1); and a fluid pump assembly (12) having a pressure side and a suction side, suction lines (12.2, 12.2a), pressure lines (12.1, 12.1a) and associated line ducts (14, 15) connecting the pressure side of the fluid pump assembly (12) with the piston/cylinder systems and connecting the suction side of the fluid pump assembly with the cooling water reservoir (KW);

the improvement comprising a hydraulic control rod drive assembly (CD) having at least one control rod drive, including:

a control valve assembly (11) disposed outside the reactor pressure vessel (1) and connected to the fluid lines (10) and the pressure lines (12.1, 12.1a), for influencing the fluid quantity on the pressure side of the fluid pump assembly (12) in order to adjust the control rods (6) in a raising and a lowering direction and to maintain a control rod position;

the control valve assembly (11) including the following control branches for actuating each of the control rods (6):

a holding branch (A) having an inlet side connected to the pressure line (12.1a) and an outlet side connected to the pressure side of the piston/cylinder system, a first fluid throttle (a1), and a bypass fluid throttle (a2) disposed upstream of said first fluid throttle relative to a drop of said first fluid throttle for discharging into the drain, said first fluid throttle (a1) and said bypass fluid throttle (a2) having throttle cross sections dimensioned for allowing a fluid flow therethrough sufficient to hold a given control rod (6) in a given position with the fluid pump assembly (12A or 12B) running;

a raising branch (B) having ends respectively connected to said holding branch (A) upstream and downstream of said first fluid throttle (a1), and a series circuit having a raising valve assembly (H) and a second fluid throttle (b1); and a lowering branch (C) having one end connected to said holding branch (A) downstream of said first fluid throttle (a1) relative to the drop of said first fluid throttle (a1), another end discharging into the cooling water reservoir (KW), and a series circuit of a lowering valve (SV) and a third fluid throttle (c1);

and means for automatically opening said lowering valve (SV) ins aid lowering branch (C) if said raising valve (H) in said raising branch (B) sticks in an open position;

said raising valve assembly (H) including another series circuit having at least two raising valves;

one of said at least two raising valves of said raising valve assembly (H) being in the form of a turbulence throttle (W100) including:

a housing having an end wall and a peripheral housing wall defining a cylindrical turbulence chamber therein;

a control flow line (C) having a tangential nozzle connected to said peripheral housing wall and discharging into said turbulence chamber;

and an outlet line (e) having an axial nozzle connected to said end wall of said housing and communicating with said turbulence chamber;

each of said at least two raising valves developing a fluid flow from said pump pressure lines (12.1, 12.1a) with an internal pressure drop $(p_c-p_e)>0$ from said tangential nozzle of said control flow line (c) to said axial nozzle of said outlet line (e) having a first flow resistance value ($Z_1$) of said turbulence throttle, whenever the other (H2) of said at least two raising valves (W100, H2) opens;

said turbulence chamber building a flow turbulence therein increasing said flow resistance within a time period ($\Delta t_2$) longer than a desired opening time period ($\Delta t_1$) of the other of said raising valves (H2), to a second flow resistance value ($Z_2$) greater than said first flow resistance value ($Z_1$) for reducing fluid flow through said turbulence throttle (W100) with the increased flow resistance ($Z_2$), and preventing further retraction and raising of the control rod being controlled, after the execution of a desired raising increment of the control rod being controlled and in the event that the other (H2) of said at least two raising valves (W100, H2) sticks in an open position thereof.

9. Hydraulic control rod drive assembly according to claim 8, wherein said control branch is in the form of a plurality of control branch assemblies ($CV_i$) and said raising branch is in the form of a plurality of parallel raising branch assemblies ($B_i$) each having raising valves, said turbulence throttle (W100) being connected in common to said plurality of control branch segments ($CV_i$) and to said plurality of raising branch segments ($B_i$), said turbulence throttle (W100) being in the form of a pilot turbulence throttle, and one of said raising valves (H2) in each of said raising branch segments ($B_i$) forming a redundant series circuit with said turbulence throttle (W100) having two raising valves.

10. Hydraulic control rod drive assembly according to claim 8, including another outlet line with one end connected to said end wall of said housing of said turbulence throttle to which said axial nozzle of said first-mentioned outlet line is connected, said other outlet line having a smaller cross section than said first-mentioned outlet line and serving as a vent line and for removing expansion water, said other outlet line having another end communicating with a hydraulic drain.

* * * * *

UNITED STATES PATENT AND TRADEMARK OFFICE
CERTIFICATE OF CORRECTION

PATENT NO. : 4,826,649
DATED : May 2, 1989
INVENTOR(S) : Batheja et al

It is certified that error appears in the above-identified patent and that said Letters Patent is hereby corrected as shown below:

In the Title Page, item (30), lines 2, 3 and 4

"(JP) Japan
(JP) Japan
(JP) Japan"

should read

- - (DE) Fed. Rep. of Germany
    (DE) Fed. Rep. of Germany
    (DE) Fed. Rep. of Germany - - .

Signed and Sealed this

Ninth Day of January, 1990

Attest:

JEFFREY M. SAMUELS

Attesting Officer    Acting Commissioner of Patents and Trademarks